Figure 1:
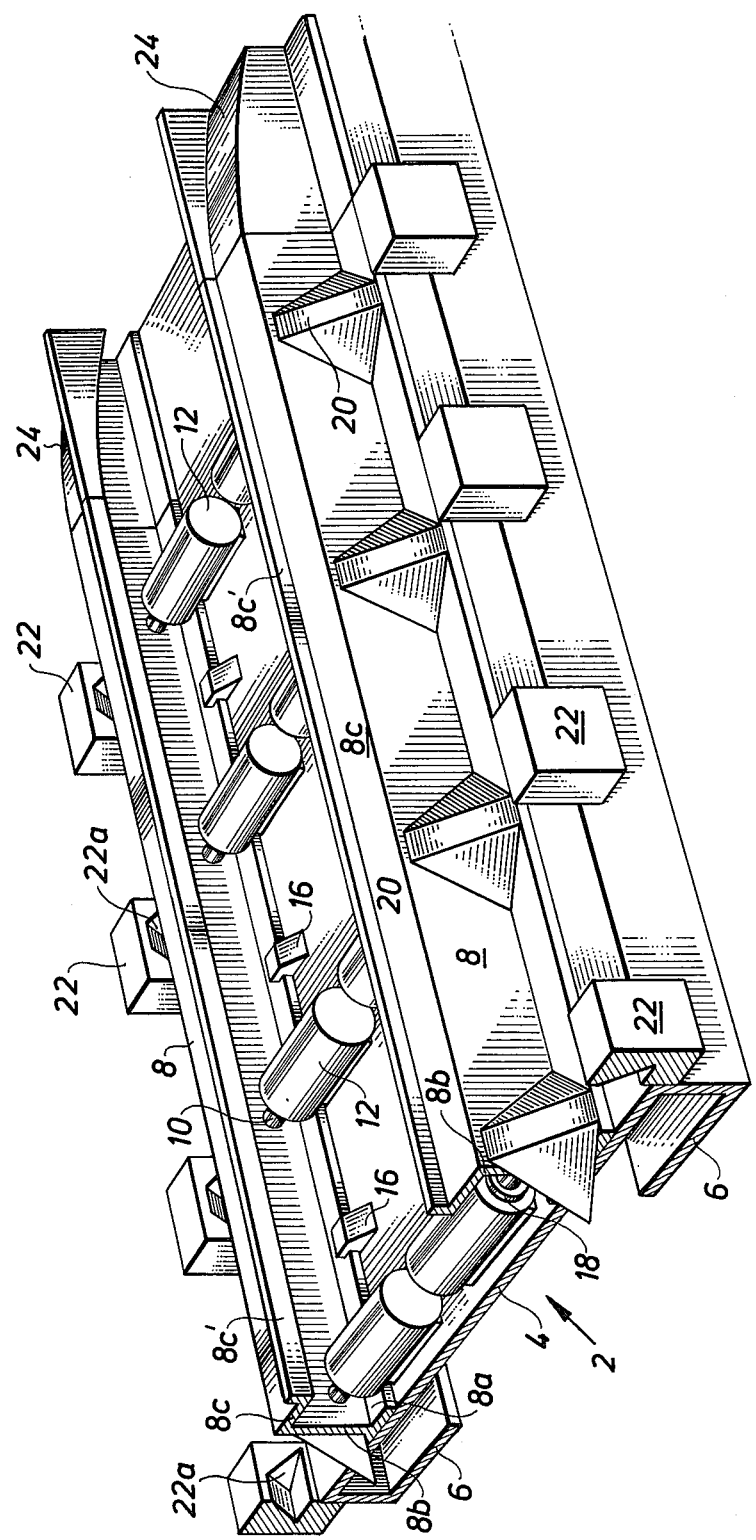

United States Patent [19]

Berger

[11] 4,089,539
[45] May 16, 1978

[54] APPARATUS FOR SUPPORTING DEMOUNTABLE FREIGHT CARRIERS ON VEHICLES

[76] Inventor: Gunvald Magnus Svante Berger, Helmfeltsgatan 4 A, S-211 48 Malmo, Sweden

[21] Appl. No.: 710,602

[22] Filed: Aug. 2, 1976

[30] Foreign Application Priority Data

Aug. 4, 1975 Sweden .............................. 7508785

[51] Int. Cl.² .............................................. B60P 7/00
[52] U.S. Cl. .............................. 280/179 R; 296/35 A; 105/463
[58] Field of Search .......................... 296/35 A, 35 R; 280/143, 144, 179 R, 179 B; 105/369, 367; 248/119, 361

[56] References Cited

U.S. PATENT DOCUMENTS 534,386   2/1895   Bettman .............................. 280/144
3,387,813   6/1968   Carino .............................. 280/144 X Primary Examiner—Philip Goodman
Attorney, Agent, or Firm—Dressler, Goldsmith, Clement, Gordon & Shore, Ltd.

[57] ABSTRACT

A carrying frame for supporting demountable freight carriers on vehicles is disclosed. The carrying frame includes a bottom portion carried by the vehicle; two substantially identical, longitudinal support elements adapted for receiving a freight carrier thereon, situated on the bottom portion and movable relative to the bottom portion in a lateral direction of the vehicle; reciprocating adjusting means on the bottom portion for moving the supporting elements to a predetermined position; and restraining means for retaining said freight carrier on said supporting elements and in a fixed position relative to said bottom portion. The reciprocating adjusting means further includes spaced first and second means for displacing the longitudinal supporting elements first in one lateral direction and then in the opposite lateral direction from said one lateral direction.

9 Claims, 5 Drawing Figures

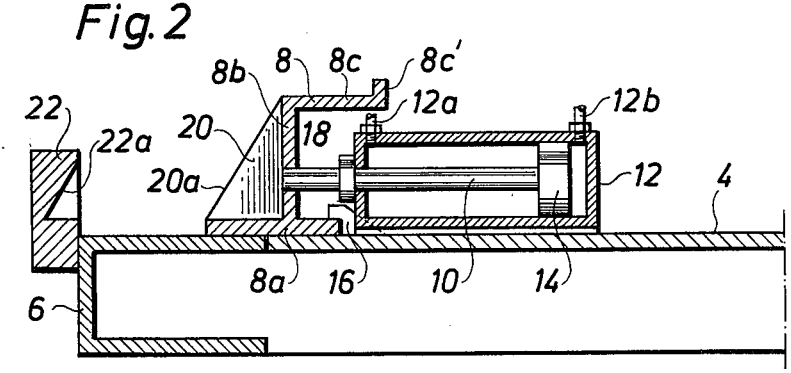
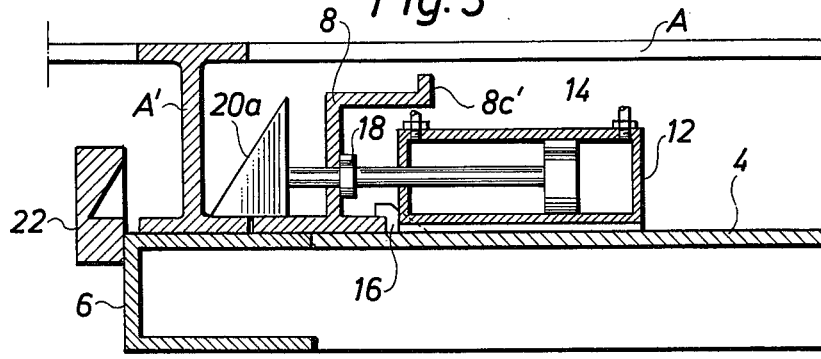
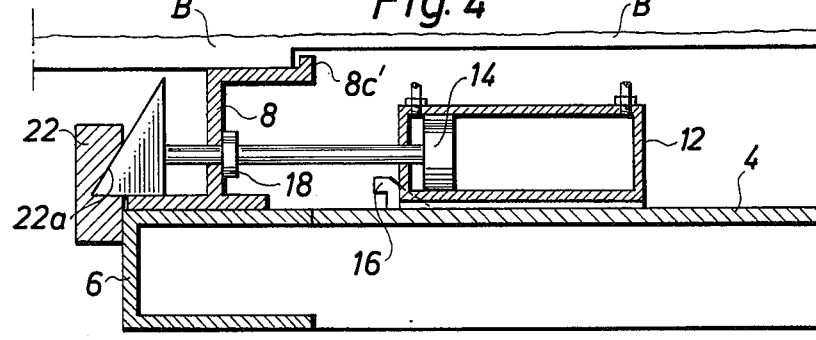
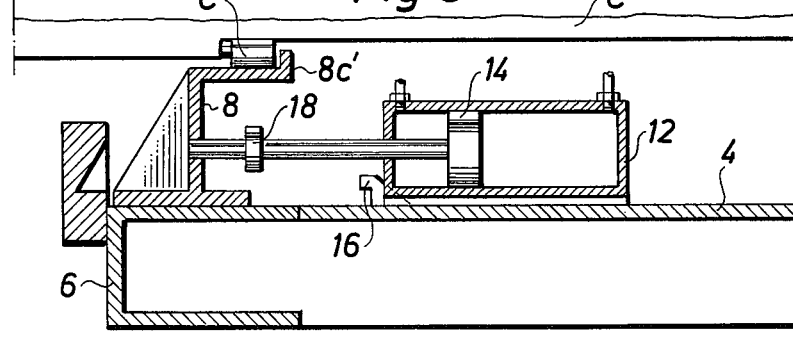

APPARATUS FOR SUPPORTING DEMOUNTABLE FREIGHT CARRIERS ON VEHICLES

The present invention relates to an apparatus for supporting on vehicles demountable freight carries of different kinds.

A large number of different kinds of vehicles are used today for transporting goods between different places. A large proportion of these vehicles consists of lorries which are provided with special carrying frames comprising apparatus for supporting and locking to these carrier frames freight carriers provided with legs, such as so-called demountable flats or containers, which with the aid of spring compressors mounted on the lorries can be brought to assume different vertical positions relative to the ground plane so that the freight carriers can be transferred to the ground and lifted up from it.

In recent years, different kinds of freight carrier have been developed to suit existing lorry types, which has entailed that a number of different kinds of freight carrier of different designs and sizes have been available on the market, and although they have functioned satisfactorily on the types of lorry for which they are intended, they have not been able to be used on other lorry types.

A solution to these problems has been attempted by standardizing the freight carriers and thereby the carrying frames supporting them on the lorries, so that a certain standard carrier can be supported on and transported by different kinds of lorry. This standarization has, however, only resulted in that a certain freight carrier can be used on several types of lorry made by one lorry manufacturer or at best on some of the lorry types made by several lorry manufacturers.

The present invention points to a way of at least partly abolishing these problems, and of providing an apparatus with which the carrying frame on the lorry can be adjusted in different positions so that it can support and firmly retain several different kinds of freight carrier the designs of which differ notably from each other.

An embodiment of the invention will now be described while referring to the attached drawings, on which FIG. 1 is a schematic perspective view of a carrying frame mounted on a lorry and including the apparatus according to the invention, and FIGS. 2-5 are partly sectional schematic views of the left-hand part of the apparatus according to FIG. 1, when it assumes different positions.

The carrying frame in FIG. 1 is generally designated 2. The carrying frame 2 is intended for fitting to a vehicle such as a lorry (not shown), and is enabled by means of spring compressors (not shown), of conventional type arranged on the vehicle, to assume a lowered position which enables the vehicle to be driven in under a freight carrier which is provided with conventional supporting legs (not shown) maintaining the freight carrier above the ground level, such as any of the freight carriers A, B or C shown in FIGS. 3-5, or in a raised position wherein the vehicle supports any of the freight carriers A, B or C, via the carrying frame.

The bottom portion of the carrying frame 2, which does not necessarily need to consist of the details shown in the figures, i.e. in the form of a plate 4 with channels 6 welded on to it, but could just as well comprise beams extending in both transverse and longitudinal directions of the carrying frame, forms a portion of a vehicle chassis or is intended to be carried by a vehicle chassis. The top portion of the carrying frame 2 consists of two longitudinal identical supporting or carrying beams 8, the cross section of which is best apparent from FIGS. 2-5. Each carrying beam 8 is arranged displaceable backwards and forwards in the transverse direction of the carrying frame 2 on the upper flange of a channel associated with the plate 4, and on the plate 4, the upper sides of said flange and plate being in the same plane. The displacement is provided by piston rods 10 working with a corresponding number of hydraulic cylinders 12, the number of which is determined by the length of the carrying frame 2. Each cylinder 12 includes inlet and outlet connections 12a and 12b (see FIG. 2), which are connected to controlling and operating means common for all cylinders, by means of which hydraulic oil under pressure can selectively be taken to and from the connections so that the piston 14 attached to the piston rod 10 is compulsorily forced to the right or left in FIGS. 2-5.

In FIGS. 1 and 2 the supporting beams 8 are shown in the position they assume when no freight carrier is supported by the carrying frame 2. In this position the beams 8 are moved farthest to the right in FIG. 2, whereby the bottom flange 8a of the supporting beam 8 is retained by a stop 16 welded onto the plate, and whereby a ring 18 attached to the piston rod 10 engages against the left-hand side of the cylinder 12. The displacement of the supporting beams 8 to the position in FIGS. 1 and 2 from any of the positions shown in FIGS. 4-5 is provided by a wedge 20 attached to each piston rod 10, the bottom of the wedge always engaging against the top side of the flange 8a to the left of the web 8b of the supporting beam 8 in FIG. 2, and the right-hand vertical side of which in FIG. 2 at movement of the piston 14 to the right is first brought into engagement against the web 8b and thereafter moves the supporting beam to the right, until the ring 18 engages with the cylinder 12 and the right-hand portion of the flange 8a engages with the stop 16. The displacement of the carrying beams 8 to any of the positions shown in FIGS. 4 and 5 from the position shown in FIGS. 1 and 2 is provided by the rings 18 attached to the piston rods 10, at movement of the pistons 14 to the left in FIG. 2 the rings being first brought into engagement against the web 8b for thereafter moving the supporting beam to the left, until the wedge 20 engages against the surface of the stopping element 22 in the wedge-shaped recess 22a.

When the carrying frame 2 is to support and firmly retain a freight carrier A of the kind shown in FIG. 3, i.e. a loading body of a kind marketed by the Swedish company Lagaholm AB, and which is provided with a loading surface and a plurality of load bearing beams attached to its underside, of which one of two I-sections A' arranged relatively close to the centre of the body are shown in FIG. 3, this body is lowered on the carrying frame 2 so that each I-section beam A' is inserted between the left-hand edge of the flange 8a and stop elements 22 welded onto the outside of the channel 6 opposite each wedge 20. During lowering, the carrying frame 2, wedge 20 etc. assume the positions shown in FIG. 2, and lowering to a position central in the carrying frame is facilitated by the lower right-hand edge of each I-section A', seen in FIG. 3, skidding at an angle downwardly on the sloping part 20a of the wedge 20 in the case where the loading body is not completely centered on the carrying frame during the initial part of lowering. Thereafter hydraulic oil is taken to the right of the piston 14 in the cylinder 12 through the connection 12b so that the wedge 20 is moved to the left in FIG. 3 until the lower left-hand corner of the wedge 20 is taken into engagement with the web of the I-section A'. This engagement takes place somewhat before or approximately simultaneously with the ring 18 being brought into engagement with the web 8b of the supporting beam 8 but before the supporting beam has had time to be moved out of engagement with the stop 16. In the position shown in FIG. 3, the body A is thus retained sideways between the stop elements 22 and the flanges 8a of the supporting beams 8 and in height by the wedges 20.

The carrying frame 2 can also support and retain a freight carrier B of the kind shown in FIG. 4, i.e. an exchangeable freight carrier complying with the German BDF and FAKRA standards. The bottom of this carrier is provided with beams B', defining between themselves a central space extending in the longitudinal direction of the carrier. Before lowering the carrier B onto the carrying frame 2, the pistons 14 are displaced by means of hydraulic oil under pressure to the left in FIG. 4. During subsequent lowering, the beams B' will be moved down onto the upper flanges 8c of the supporting beams 8 and rest on them. If so required, the pistons 14 and thereby the supporting beams 8 are thereafter moved further to the left so that the wedges 20 are inserted into the wedge-shaped recesses 22a of the stopping elements 22, whereat the upwardly projecting rails 8c' on the flanges 8c will come into engagement with or lie at a little distance from the inner edges of the beams B'. The carrier B is thereby restrained against sideways movement. If it is considered necessary, special locking means can be arranged to lock the carrier in height and lengthwise.

The carrying frame 2 can also support and retain other freight carriers than those shown in FIGS. 3 and 4, e.g. a freight carrier C of the kind shown in FIG. 5, i.e a loading body of the type marketed under the name PENCO LOAD-O-MATIC and which is similar to the carrier B in FIG. 4, with the essential difference that the body C is provided with rollers C' which, when loading the body onto the supporting frame in a known way, are lowered into recessed portions 24 constituting extensions of the rearward portions (see FIG. 1) of the upper flanges 8c of the carrying beams 8, thereby ensuring that the body is locked longitudinally. The procedure for moving the carrying beams 8 sideways is the same as described in conjunction with FIG. 4. In FIG. 5 the position of the apparatus is not shown for when the body C is locked onto the carrying frame 2, but for the position immediately after the wedge 20 has been moved backwards somewhat, to move the supporting beam 8 away from the rollers C'.

The supporting beams 8 can thus be caused partly to assume a first position as in FIGS. 4 and 5, whereby they support the longitudinal supporting beams B' or C' associated with the freight carrier B or C, the latter beams being at a relatively long distance from the side edges of the freight carrier so that the freight carrier rests on the carrying frame in a higher plane than the bottom of the carrying frame 2 and is thereby caused to maintain such a height above the ground that it does not affect the springing movements of the vehicle, and partly a second position as shown in FIGS. 1, 2 and 3 whereby they do not prevent the longitudinal beams A' associated with the freight carrier A and attached at a relatively long distance from the side edges thereof, to rest directly on the bottom portion of the carrying frame 2 so that lower load height and centre of gravity are obtained. In said second position the supporting beams 8 support the beams A' against lateral forces.

There has been described above an embodiment of an apparatus for supporting freight carriers transported by vehicles, said apparatus not only enabling a plurality of load carrier types to be supported on, and locked to, the carrying frame of one vehicle, but also that different kinds of freight carrier having different heights when placed on the carrying frame will assume substantially the same height above ground level, which considerably facilitates loading and unloading on loading bays of standard height.

Even if only one embodiment of the invention has been shown on the drawings and described above, it should be understood that the invention is not restricted to this embodiment but is only limited by the disclosures in the appended claims.

I claim:

1. A carrying frame for supporting freight carriers demountable from a vehicle which comprises
    a bottom portion carried by said vehicle;
    two substantially identical, longitudinal supporting elements adapted for receiving a freight carrier thereon situated on said bottom portion and movable relative to said bottom portion in a lateral direction of said vehicle;
    reciprocating adjusting means on said bottom portion for moving said supporting elements to a predetermined position; and
    restraining means for retaining said freight carrier on said supporting elements and in a fixed position relative to said bottom portion;
    said reciprocating adjusting means including spaced first and second means for displacing said longitudinal supporting elements first in one lateral direction and then in the opposite lateral direction from said one lateral direction.

2. The carrying frame in accordance with claim 1 wherein said supporting elements are beams extending in the longitudinal direction of the carrying frame and having an upper flange for receiving said freight carrier, and wherein said restraining means are upwardly projecting rails on said beams.

3. The carrying frame in accordance with claim 1 wherein said supporting elements are beams extending in the longitudinal direction of the carrying frame and having an upper flange for receiving said freight carrier, and wherein said restraining means are sideways projecting bottom flanges on said beams.

4. The carrying frame in accordance with claim 1 wherein said supporting elements are beams extending in the longitudinal direction of the carrying frame and having an upper flange for receiving said freight carrier, and wherein said restraining means is a laterally displaceable wedge associated with each of said beams and slidably engaging the top side of a bottom flange on each of said beams.

5. The carrying frame in accordance with claim 4 wherein said wedge is adapted to extend laterally beyond said bottom flange and engage a downwardly projecting load bearing member of the freight carrier so as to prevent a lateral displacement of the freight carrier.

6. The carrying frame in accordance with claim 1 wherein said adjusting means are fluid-driven piston-cylinder means.

7. A carrying frame for supporting freight carriers demountable from a vehicle which comprises
   a bottom portion carried by said vehicle;
   two substantially identical, longitudinal supporting elements adapted for receiving a freight carrier thereon situated on said bottom portion and movable relative to said bottom portion in a lateral direction of said vehicle;
   fluid-driven, piston-cylinder adjusting means on said bottom portion for moving said supporting elements to a predetermined position; and
   restraining means for retaining said freight carrier on said supporting elements and in a fixed position relative to said bottom portion;
   said fluid-driven piston-cylinder adjusting means including first means for displacing said longitudinal supporting elements in one lateral direction and second means for displacing said longitudinal supporting elements in the opposite lateral direction, and wherein said first means and said second means are spaced from one another at a distance greater than the width of the supporting element on which said first means and said second means act.

8. The carrying frame in accordance with claim 7 wherein stopping elements each having a recess are provided on said bottom portion and are positioned opposite said second means, and wherein said second means is adapted to be received in said recesses so as to prevent movement of said longitudinal supporting elements vertically in relation to said bottom portion.

9. The carrying frame in accordance with claim 7 wherein said second means is a wedge having a sloping upper surface adapted to receive and guide downwardly a load bearing member projecting from the underside of the freight carrier as the freight carrier is lowered onto the carrying frame.

* * * * *